US012794071B2

(12) United States Patent
Qiu et al.

(10) Patent No.: US 12,794,071 B2
(45) Date of Patent: Nov. 10, 2026

(54) BATTERY CELL MODULE AND BATTERY SYSTEM

(71) Applicant: EVE POWER CO., LTD., Jingmen (CN)

(72) Inventors: Wencong Qiu, Jingmen (CN); Zhaohai Chen, Jingmen (CN); Zhiwei Chen, Jingmen (CN); Jibing Jiang, Jingmen (CN); Fan Li, Jingmen (CN)

(73) Assignee: EVE POWER CO., LTD., Jingmen (CN)

( * ) Notice: Subject to any disclaimer, the term of this patent is extended or adjusted under 35 U.S.C. 154(b) by 904 days.

(21) Appl. No.: 18/002,842

(22) PCT Filed: Oct. 12, 2022

(86) PCT No.: PCT/CN2022/124959

§ 371 (c)(1),
(2) Date: Dec. 21, 2022

(87) PCT Pub. No.: WO2023/142533

PCT Pub. Date: Aug. 3, 2023

(65) Prior Publication Data

US 2024/0120600 A1 Apr. 11, 2024

(30) Foreign Application Priority Data

Jan. 29, 2022 (CN) ........................ 202220245085.X

(51) Int. Cl.
*H01M 50/264* (2021.01)
*H01M 50/107* (2021.01)
*H01M 50/213* (2021.01)

(52) U.S. Cl.
CPC ....... *H01M 50/264* (2021.01); *H01M 50/107* (2021.01); *H01M 50/213* (2021.01)

(58) Field of Classification Search
None
See application file for complete search history.

(56) References Cited

U.S. PATENT DOCUMENTS

2020/0099028 A1* 3/2020 Chang ................ H01M 50/503

FOREIGN PATENT DOCUMENTS

| | | | | |
|---|---|---|---|---|
| CN | 202111168 U | | 1/2012 | |
| CN | 105938887 A | | 9/2016 | |
| CN | 206163563 U | * | 5/2017 | |
| CN | 206194822 U | | 5/2017 | |
| CN | 109119556 A | * | 1/2019 | ............ H01M 50/20 |
| CN | 215008485 U | * | 12/2021 | |

(Continued)

OTHER PUBLICATIONS

Machine translation of CN109119556 A (Year: 2025).*

(Continued)

*Primary Examiner* — Maria Laios
(74) *Attorney, Agent, or Firm* — PV IP PC; Wei Te Chung; Christopher S. Ruprecht

(57) ABSTRACT

The present application discloses a battery cell module and a battery system. The battery cell module includes a plurality of battery cells and a plurality of end covers. Each of the battery cells is provided with one of the end covers, and adjacent two of the end covers are detachably connected to each other, so that the plurality of battery cells are relatively fixed into a group.

19 Claims, 4 Drawing Sheets

(56) References Cited

FOREIGN PATENT DOCUMENTS

| | | | |
|---|---|---|---|
| CN | 114464941 | A | 5/2022 |
| CN | 217158386 | U | 8/2022 |
| CN | 217158421 | U | 8/2022 |
| CN | 217544799 | U | 10/2022 |

OTHER PUBLICATIONS

Machine translation of CN215008485 U printed Mar. 22, 2026 (Year: 2026).*

European Office Action issued in corresponding European Patent Application No. 22817516.2 dated Apr. 25, 2025, pp. 1-8.

International Search Report in International application No. PCT/CN2021/124959, mailed on Dec. 12, 2022.

Written Opinion of the International Search Authority in International application No. PCT/CN2021/124959, mailed on Dec. 12, 2022.

* cited by examiner

BATTERY CELL MODULE AND BATTERY SYSTEM

CROSS-REFERENCE TO RELATED APPLICATION

This application is a national stage of International Application No. PCT/CN2022/124959, filed on Oct. 12, 2022, which claims priority to Chinese Patent Application No. 202220245085. X, filed on Jan. 29, 2022. The aforementioned application is herein incorporated by reference in its entirety.

TECHNICAL FIELD

The present application relates to the technical field of battery technologies, for example, to a battery cell module and a battery system.

BACKGROUND

New energy vehicles have realized leap-style development, such as new energy vehicles adopting lithium batteries as motive power. Cylindrical battery cells of the lithium batteries are widely used in power systems. However, small capacity of a single battery cell leads to a large number of batteries in a single string.

In generally cylindrical battery cell modules, the battery cells are positioned by tooling and then bonded together through glues, which leads to inaccurate position of the battery cells and affects position accuracy of adjacent battery cells, thus resulting in a great cumulative tolerance.

In addition, for the battery cell modules in the related art, arrangement of a plurality of battery cells is not compact, and an overall size of the battery cells is great. Insulation is generally performed for busbars so as to avoid contact between the busbars and shells of the battery cells, resulting in high cost of the battery cell modules.

SUMMARY

The present application provides a battery cell module and a battery system to solve a problem of inaccurate position of battery cells.

In a first aspect, a battery cell module is provided in embodiments of the present application, including a plurality of battery cells and a plurality of end covers, wherein an end of each of the battery cells is provided with one of the end covers, and adjacent two of the end covers are detachably connected to each other, so that the plurality of battery cells are relatively fixed into a group.

In an embodiment, each of the end covers is provided with an accommodating slot, and an end of the battery cell corresponding to the end cover is fixed in the accommodating slot.

In an embodiment, each of the end covers includes a cover plate and a plurality of side plates, wherein the cover plate is a polygonal plate, each side edge of the cover plate is connected to one of the side plates, and two opposite side plates in adjacent two of the end covers are engaged with each other.

In an embodiment, a number of edges of the polygonal plate is an even number, a first one of two side plates located at two opposite sides of the polygonal plate is provided with a clamping block, a second one of the two side plates is provided with a clamping slot, and the clamping block and the clamping slot opposite to each other on adjacent two of the end covers are engaged with each other.

In an embodiment, a width of the clamping slot is gradually increased towards inside of the accommodating slot along a radial direction of a battery cell corresponding to the clamping slot, and a shape of the clamping block is matched with a shape of the clamping slot.

In an embodiment, the cover plate is a regular hexagon plate.

In an embodiment, the plurality of battery cells are cylindrical, a side surface of each of the plurality of side plates facing each of the battery cells corresponding to the side plate is an arc-shaped surface matched with an outer wall of the battery cell, and a side surface of each of the plurality of side plates away from the battery cell is a plane.

In an embodiment, a middle portion of each of the plurality of side plates is provided with a notch having an opening downward facing another end of the battery cell corresponding to the side plates.

In an embodiment, the plurality of side plates are fixedly bonded with the battery cell corresponding to the side plates.

In an embodiment, a bonding area between the plurality of side plates and the battery cell corresponding to the side plates ranges from 50% to 80% of a contact area between the plurality of side plates and the battery cell.

In an embodiment, each accommodating slot is correspondingly disposed in clearance fit with one of the battery cells, and a fit clearance therebetween ranges from 1 mm to 2 mm.

In an embodiment, a depth of the accommodating slot ranges from 5 mm to 20 mm.

In an embodiment, each of the end covers is sleeved at an end of one of the battery cells and provided with a via hole, and an electrode column of each of the battery cells is extended out of a respective one of the end covers from the via hole of the respective end cover.

In an embodiment, each of the end covers is made of an insulating material and capable of supporting a busbar connected to an electrode column of a battery cell corresponding to the end cover.

In an embodiment, each of the end covers is provided with a flange surrounding the via hole, and wherein the flange is configured to support a busbar connected to an electrode column of a battery cell corresponding to the end cover.

In an embodiment, each of the end covers or the flange is provided with a position column matched with a busbar.

A battery system is provided in embodiments of the present application, including any of the above-mentioned battery cell modules.

Beneficial Effects According to the Embodiments

According to the battery cell module in the present application, each of the battery cells is individually provided with one of the end covers, and the end covers are spliced to form a group, which makes an assembly of the battery cell module convenient, and is beneficial to improve relative position accuracy between the battery cells, thereby improving assembly accuracy of the battery cell module. After the battery cells are grouped, since the end covers are connected as a whole, it is beneficial to improve structural strength and reliability of the battery cell module.

Since the end cover is made of the insulating material, the busbar can be separated from a shell of the battery cell without insulation of the busbar, which is beneficial to reduce cost.

By adopting the above-mentioned battery cell module, the battery system provided by the present application has high processing precision, low cost, and a reliable structure.

REFERENCE NUMERALS

1, battery cell; 11, electrode column; 2, end cover; 21, cover plate; 211. via hole; 22, side plate; 221, clamping block; 222, clamping slot; 223, notch; 23. flange; 24, accommodating slot; 3, busbar.

DETAILED DESCRIPTION OF THE EMBODIMENT

In description of the present application, unless otherwise specified and defined, terms “connected with”, “connected” and “fixed” should be understood in a broad sense, for example, it may be a fixed connection, a detachable connection, or a whole; it may be a mechanical connection or an electrical connection; it may be a directly connection or an indirectly connection through an intermediate media; and it may be an internal communication of two components or an interaction relationship between two components. For those skilled in the art, meanings of the above terms in the present application can be understood according to situations.

In the present application, unless otherwise specified and defined, a first feature is disposed “on” or “under” a second feature may include a direct contact between the first feature and the second feature, or a contact between the first feature and the second feature through other features rather than the direct contact. Moreover, that the first feature is disposed “up”, “above”, and “on” the second feature includes that the first feature is right above or obliquely above the second feature, or only indicate that a horizontal height of the first feature is greater than a horizontal height of the second feature. That the first feature is disposed “under”, “below”, or “underneath” of the second feature include that the first feature is right below or obliquely below the second feature, or only indicate that the horizontal height of the first feature is less than the horizontal height of the second feature.

In the description of this embodiment, terms indicating orientation or location relationships such as “up”, “down”, “left”, and “right” are based on orientation or location relationships shown in drawings, which are only for a convenience of description and simplified operation, rather than indicating or implying that devices or elements referred to must have a specific orientation, be constructed and operated in a specific orientation, so it cannot be understood as a limitation of the present application. In addition, terms “first” and “second” are only used to distinguish in terms of description and have no special meanings.

Figure 1:
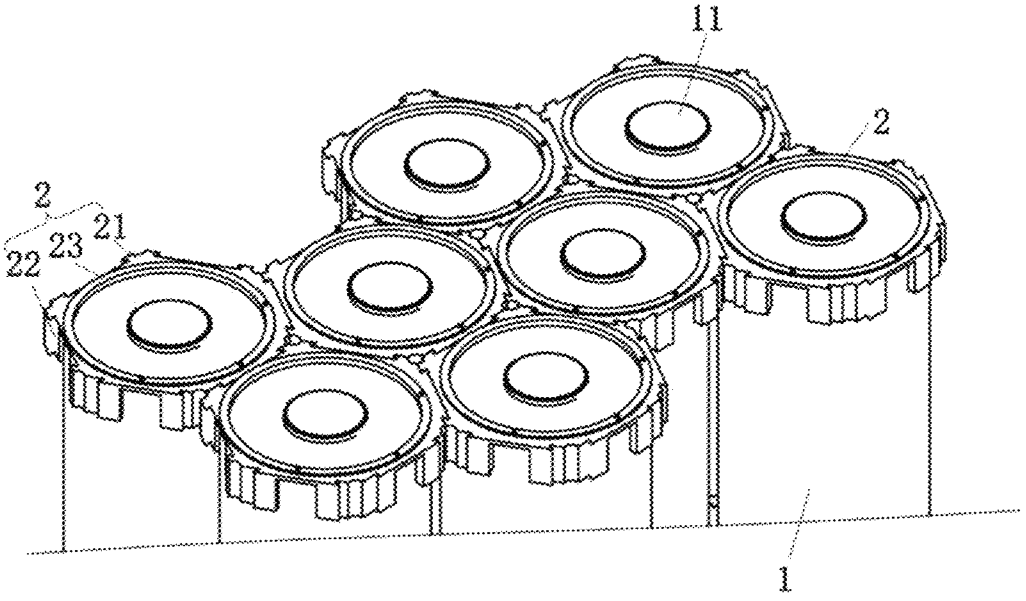
FIG. 1 is a schematic structural diagram of a battery cell module provided by the present application.

As shown in FIG. 1, the embodiment provides a battery system, including a battery cell module. The battery cell module includes a plurality of battery cells 1 and a plurality of end covers 2. An end of each of the battery cells 1 is provided with one of the end covers 2. Each of the end covers 2 can be detachably connected to an adjacent one of the end covers 2, so that the plurality of battery cells 1 are relatively fixed into a group. When the battery cell module is assembled, each of the battery cells 1 is first connected to an end cover 2 corresponding to the battery cell 1, and then the plurality of battery cells 1 can be relatively fixed into the group by splicing among the end covers 2.

In the embodiment, the battery cell module does not need to be positioned by tooling during an assembly process. Each of the battery cells 1 is individually provided with one of the end covers 2, which makes grouping of the battery cells 1 more convenient. A detachable connection among the end covers 2 is beneficial to improve a relative position accuracy between the battery cells 1, so as to improve an assembly accuracy of the battery cell module. An assembly quantity of the battery cells 1 can be adjusted adaptively according to a capacity, and a size and a shape of a box body of the battery cell module, which makes grouping methods more flexible. After the battery cells 1 are grouped, since the end covers 2 are connected as a whole, it is beneficial to improve structural strength and reliability of the battery cell module.

The end cover 2 is disposed at an axial end of the battery cell 1, so that the end cover 2 restricts the axial end of the battery cell 1, which is beneficial to improve a position accuracy of the battery cell 1.

The end cover 2 is sleeved on the axial end of the battery cell 1. The end cover 2 is provided with an accommodating slot 24, and an end of the battery cell 1 is fixed in the accommodating slot 24. A side wall of the accommodating slot 24 can limit an extension direction of the battery cell 1, so that it can be ensured that the plurality of battery cells 1 are arranged in parallel after the plurality of battery cells 1 are grouped, which further improves the position accuracy of the battery cell 1.

In order to improve a position effect of the accommodating slot 24 on the battery cell 1, a certain matching depth is required between the accommodating slot 24 and the battery cell 1. Optionally, a depth of the accommodating slot 24 in an axial direction of the battery cell 1 ranges from 5 mm to 20 mm, such as, 10 mm, 12 mm, 15 mm, or 18 mm.

In the embodiment, the end cover 2 is sleeved at a positive terminal of the battery cell 1. In some embodiments, the end cover 2 may be disposed at a negative terminal of the battery cell 1, or be disposed at both the positive terminal and the negative terminal of the battery cell 1.

Figure 2:
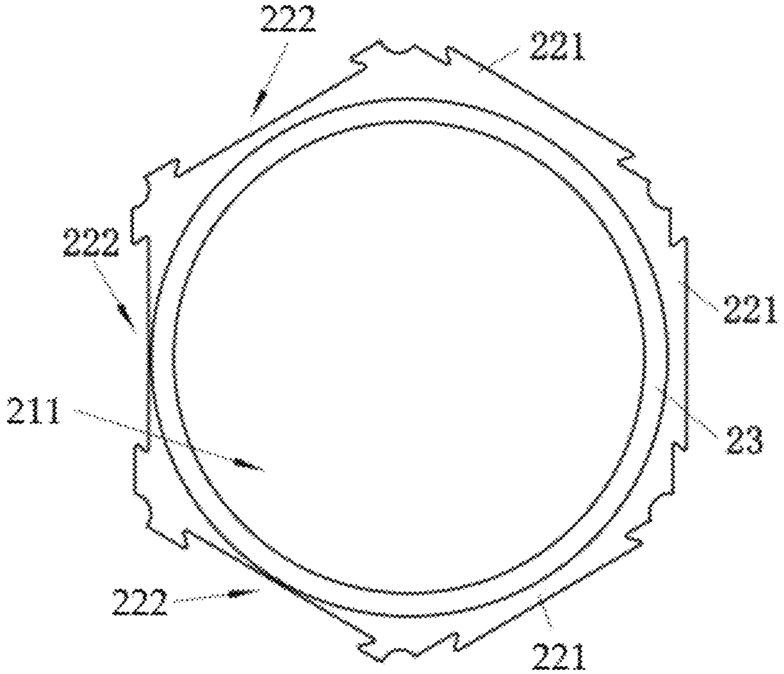
FIG. 2 is a top view of an end cover provided by the present application.
Figure 3:
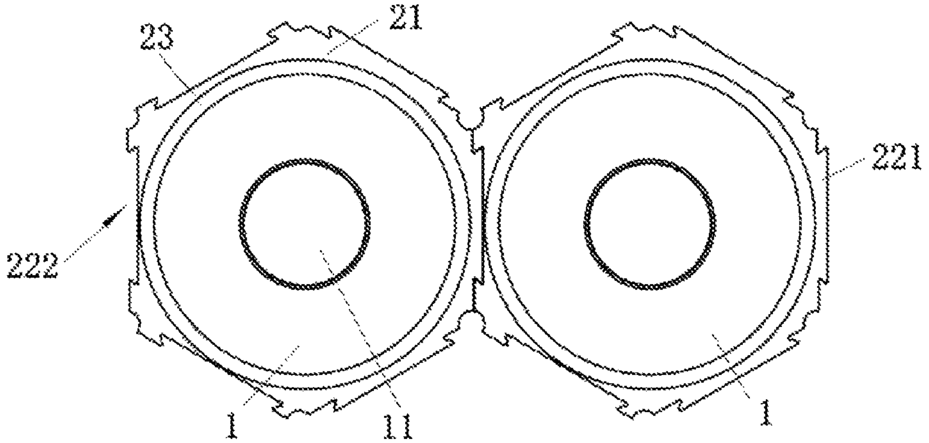
FIG. 3 is a top view of two battery cells spliced by the end covers provided by the present application.

As shown in FIG. 1 to FIG. 3, the end cover 2 includes a cover plate 21 and a plurality of side plates 22. The cover plate 21 is a polygonal plate, each side edge of the cover plate 21 is connected to one of the side plates 22, and an accommodating slot is defined by the cover plate 21 and the plurality of side plates 22. In the embodiment, the cover plate 21 is provided as the polygonal plate, and thus the end cover 2 is approximately prismatic as a whole, which is beneficial to making a structure of the plurality of end covers 2 more compact when they are spliced, thereby improving space utilization, and further reducing a size of the battery cell module. It can be understood that, on a basis that a size of the end cover 2 along a radial direction of the battery cell

1 remains unchanged, an area of the cover plate 21 when it is polygonal is less than an area of the cover plate 21 when it is circular, which can save space and materials required for processing the end cover 2, and thus be beneficial to reduce cost.

The side plate 22 connected to every side edge of the cover plate 21 may be spliced with adjacent ones of the end covers 2, to increase a number of the end covers 2 with which that each of the end covers 2 can be spliced, thereby making a structure of the plurality of battery cells 1 more compact after they are grouped.

The cover plate 21 is a rectangular plate or a regular hexagon plate so as to facilitate splicing of the plurality of end covers 2. Rectangular plates and regular hexagon plates can be respectively spliced into a relatively complete rectangular region, and a shape of a spliced region is a standard shape, which is convenient for planning an installation location of the battery cell module in the battery system, and is beneficial to improve space utilization.

In the embodiment, the battery cell 1 is cylindrical. A shape of the cover plate 21 is a regular hexagon so as to further improve the space utilization of the battery cell module. It can be understood that, on a basis of ensuring that the end cover 2 can be sleeved outside the battery cell 1, an area of the regular hexagon plate is less than an area of a circular plate. By designing the cover plate 21 as a regular hexagon plate, it is beneficial to reduce a size of the battery cell module after the cover plates are spliced and reduce materials adopted by the end cover 2, thereby reducing cost.

To realize splicing between adjacent ones of the end covers 2, each of the side plates 22 is provided with a clamping block 221 or a clamping slot 222, as shown in FIG. 2 and FIG. 3. When adjacent two of the end covers 2 are spliced, a first one of two opposite side plates 22 located at the two of the end covers 2 is provided with the clamping block 221, and a second one of the two opposite side plates 22 is provided with the clamping slot 222. The two ones of the end covers 2 can be fixedly spliced by engagement of the clamping block 221 with the clamping slot 222. The clamping block 221 is accommodated in the clamping slot 222 after the end covers 2 are spliced, which can make outer contours of two right opposite side plates 22 of the two ones of the end covers 2 overlap, so as to reduce a splicing gap between the two end covers 2 and make the splicing more compact.

For example, the clamping slot 222 penetrates through two ends of the end cover 2 along an axial direction of the end cover 2, so that the clamping slot 222 is defined as a through-slot. The above arrangement enables the clamping block 221 to move in both a positive direction and a negative direction along the axial direction of the end cover 2, so as to be engaged with or disengaged from the clamping slot 222, which is more convenient for an installation.

In addition, errors of a size of the clamping block 221 and a size of the clamping slot 222 can be compatible by defining the clamping slot 222 as the through-slot. For example, when the size of the clamping block 221 is greater than the size of the clamping slot 222 along the axial direction of the end cover 2, a matching location of the clamping block 221 and the clamping slot 222 along the axial direction can be adjusted to make top surfaces of the adjacent ones of the end covers 2 flush, so as to ensure relative position accuracy of the plurality of battery cells 1 after they are grouped.

In the embodiment, as shown in FIG. 2, a width of the clamping slot 222 is gradually increased towards inside of the accommodating slot 24 along the radial direction of the battery cell 1, and a shape of the clamping block 221 is matched with a shape of the clamping slot 222, so that an inner wall of the clamping slot 222 can prevent the clamping block 221 from pulling out of the clamping slot 222 along the radial direction of the battery cell 1 after the clamping block 221 is engaged with the clamping slot 222, which is beneficial to improve an engagement effect between the clamping block 221 and the clamping slot 222.

For example, the clamping slot 222 is defined as a trapezoidal slot, and a sectional shape of the clamping block 221 along the radial direction of the battery cell 1 is trapezoidal.

A number of edges of the polygonal plate is an even number. A first one of two side plates 22 located at two opposite sides of the polygonal plate is provided with the clamping block 221, and a second one of the two side plates 22 is provided with the clamping slot 222. The clamping block 221 and the clamping slot 222 opposite to each other in two adjacent ones of the end covers 2 are engaged with each other to make the plurality of spliced end covers 2 the same. That is, only one type of the end cover 2 needs to be manufactured in the battery cell module, which is beneficial to reduce processing cost and facilitate splicing.

In the embodiment, the cover plate 21 is designed as a regular hexagon. Each of the side plates 22 connected to three adjacent edges of the cover plate 21 is respectively provided with the clamping block 221, and each of the side plates 22 connected to another three adjacent edges of the cover plate 21 is respectively provided with the clamping slot 222.

Figure 4:
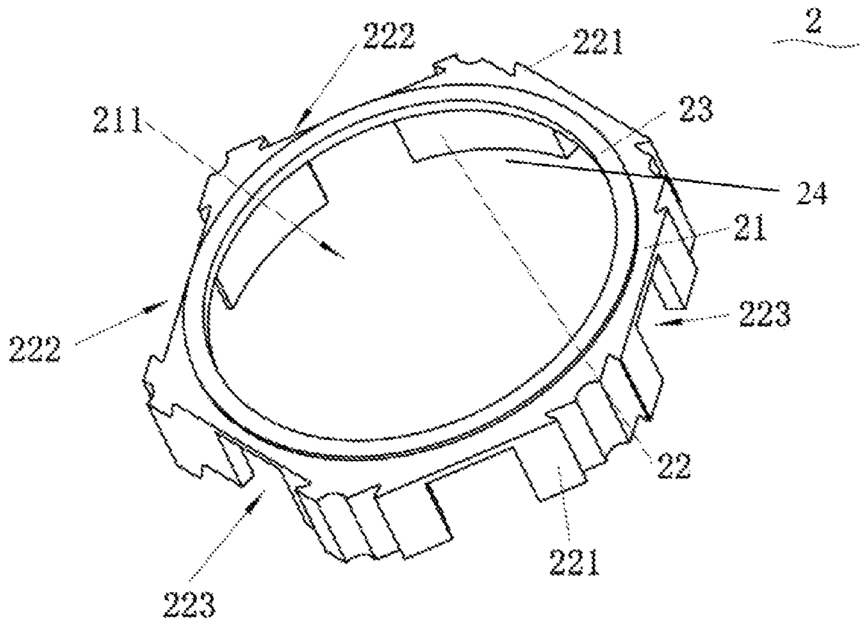
FIG. 4 is a schematic structural diagram of the end cover provided by the present application.

As shown in FIG. 3 and FIG. 4, since the battery cell 1 is cylindrical, a side surface of each of the side plates 22 facing each of the battery cells 1 corresponding to the side plate 22 is an arc-shaped surfaces matched with an outer wall of the battery cell 1 so as to improve fixing and position effects of the accommodating slot 24 on the battery cell 1. A Side surface of each of the side plates 22 away from the battery cell 1 corresponding to the side plate 22 is a plane to facilitate a processing of the clamping block 221 and the clamping slot 222 on the side plate 22, so as to reduce processing difficulty and improve processing accuracy of the clamping block 221 and the clamping slot 222.

Since the side surface each of the side plates 22 away from the battery cell 1 corresponding to the side plate 22 is the plane, and the side surface of the side plate 22 facing the battery cell 1 is the arc-shaped surface, a thickness of the side plate 22 is uneven. A thickness at a connection location of two side plates 22 is greater, and a thickness at a middle location of the side plate 22 is less. In order to reduce a size and processing cost of the battery cell module after the end covers 2 are spliced, a distance between the side plate 22 and an axis of the end cover 2 is designed to be as small as possible, resulting in a thin thickness in middle portion of the side plate 22, which makes it difficult to process the middle portion of the side plate 22, has a poor strength, and is prone to deformation or fracture.

Figure 5:
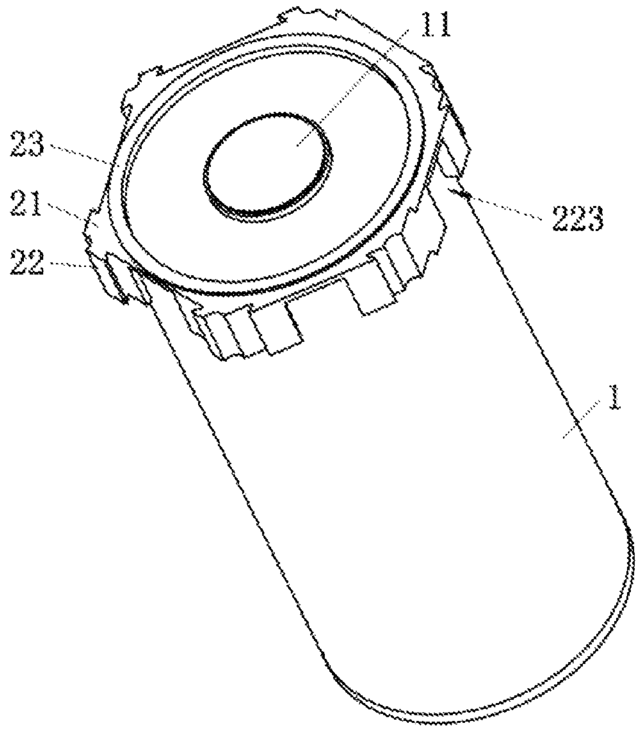
FIG. 5 is a schematic diagram of a structure of both the battery cell and the end cover after they are fixed.

In order to solve the above problems, the middle portion of each of the side plates 22 in the embodiment is provided with a notch 223 with openings downward facing another end of the battery cell 1, as shown in FIG. 5. By disposing the notch 223, thinner portion of each of the side plates 22 may be removed, and thicker and stronger portion of each of the side plates 22 may be retained, thereby reducing processing difficulty of the end cover 2, improving strength of the end cover 2, saving materials, and helping to reduce cost.

In the embodiment, the notch 223 is extended to a bottom surface of the cover plate 21, so that each of the side plates 22 includes two extension arms disposed at intervals, and the extension arms of two adjacent side plates 22 are connected and located at a corner of the cover plate 21.

Each of the end covers 2 is made of an insulating material, which can separate a shell of the battery cell 1 from other structures, and be beneficial to improve reliability of the battery cell module.

Optionally, each of the end covers 2 may be made of a plastic material with low cost and light weight. For example, each of the end covers 2 is integrally molded through an injection molding process to simplify processing steps.

Figure 6:
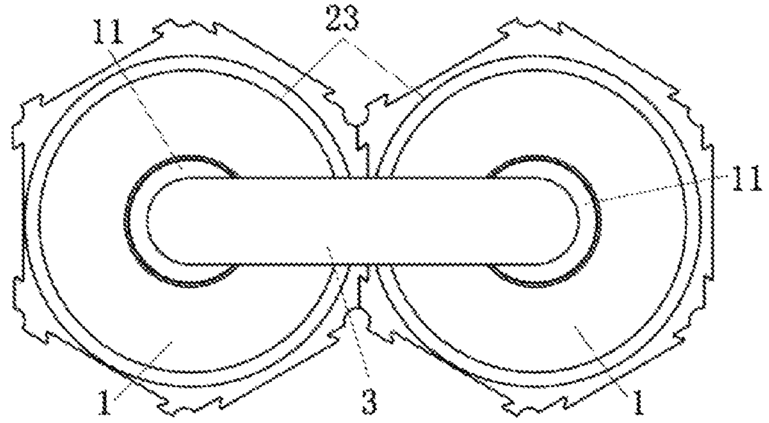
FIG. 6 is a top view of the battery cells connected through a busbar provided by the present application.

As shown in FIG. 6, one end of each of the battery cells 1 is provided with an electrode column 11, where the electrode column 11 needs to be connected to a busbar 3, so that the plurality of battery cells 1 are electrically connected by the busbar 3. In order to ensure that the battery cell module can work normally, the busbar 3 needs to be insulated from the shell of each of the battery cells 1. In the related art, an insulation is generally performed on the busbar 3 to realize an insulation between the busbar 3 and the shell of the battery cell 1, which greatly increases cost of the battery cell module.

To solve the above problem, as shown in FIG. 4 and FIG. 6, each of the cover plates 21 is provided with a via hole 211, and the electrode column 11 of the battery cell 1 is extended out of the end cover 2 from the via hole 211, so that the battery cell 1 is connected to the busbar 3. Each of the end covers 2 is further configured to support the busbar 3, so as to separate the busbar from the shell of the battery cell 1 and avoid a contact between the busbar 3 and the shell of the battery cell 1. The busbar 3 in the embodiment does not need to be insulated, which is beneficial to reduce processing cost. By separating the busbar 3 from the shell of the battery cell 1 via the end cover 2, an insulation effect between the busbar 3 and the shell of the battery cell 1 is great.

Figure 7:
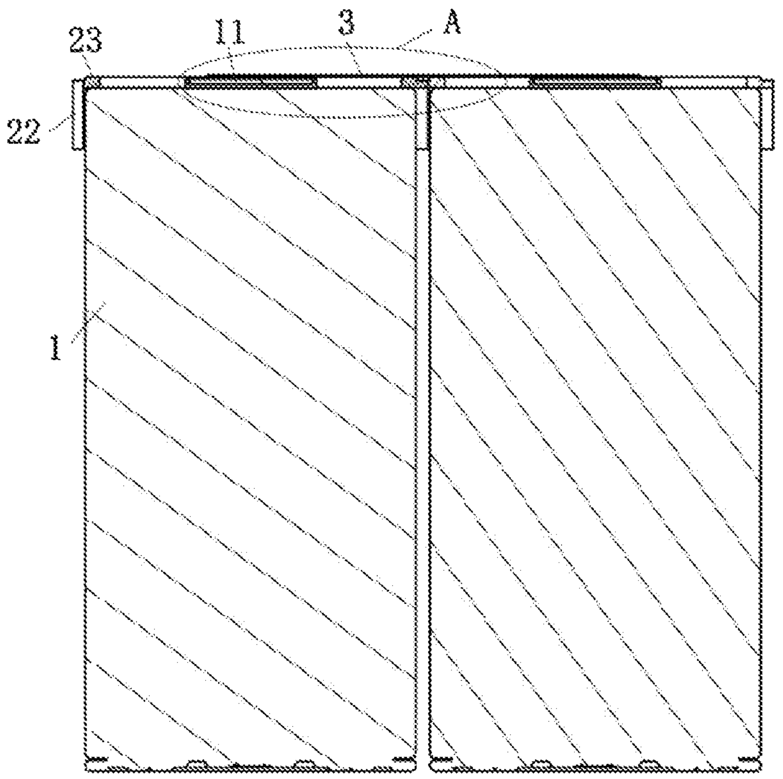
FIG. 7 is a cross-sectional diagram of a structure shown in FIG. 6.
Figure 8:
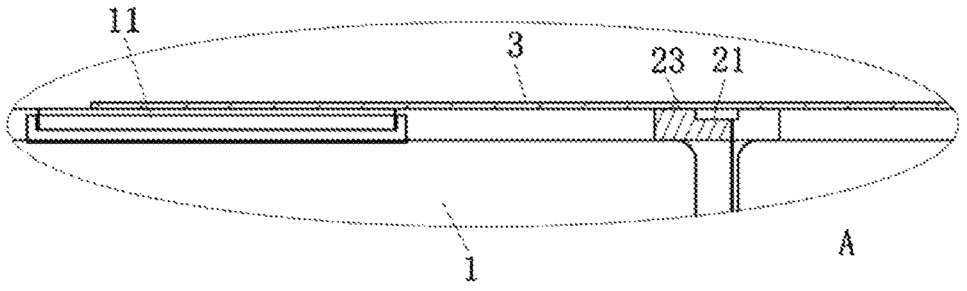
FIG. 8 is a partial enlarged diagram of a location A in FIG. 7.

As shown in FIG. 7 and FIG. 8, an outer wall of the cover plate 21 is provided with a flange 23 surrounding the via hole 211. The flange 23 is configured to support the busbar 3, which can further increase a distance between the busbar 3 and the shell of the battery cell 1, so that the insulation effect between the busbar 3 and the shell of the battery cell 1 is great.

For example, the cover plate 21 or the flange 23 is provided with a position column matched with the busbar 3, and the busbar 3 is provided with a position hole. When the busbar 3 is installed, the position column is extended into the position hole to limit a location of the busbar 3 through an engagement of the position column with the position hole, so as to improve a position effect of the busbar 3, thereby avoiding a separation of the busbar 3 from the electrode column 11 or a contact of the busbar 3 and the shell of the battery cell 1 due to external forces. A connection between the position column and the position hole may be either clamped or riveted.

For example, the end cover 2 and the battery cell 1 are fixedly bonded by glues, so as to prevent from damaging a structure of the battery cell 1 and reduce a size of the end cover 2 and the battery cell 1 after they are fixed, on a basis of achieving a fixation of the end cover 2 and the battery cell 1.

Since the cover plate 21 of each of the end covers 2 is provided with the via hole 211, and the via hole 211 is matched with the electrode column 11, if the glues overflows to cover the outer wall of the cover plate 21 or the electrode column 11 during a bonding process, a conduction effect between the electrode column 11 and the busbar 3 will be affected. Therefore, a removing process of the glues needs to be added after the bonding process, which not only increases processing procedures and cost, but also easily damages the battery cell 1 during the removing process of the glues.

To avoid the above problem, each of the side plates 22 of each of the end covers 2 in the embodiment are fixedly bonded with the battery cell 1. On one hand, a distance between a location for applying the glues and the cover plate 21 can be increased to prevent an overflow of the glues from covering the cover plate 21 or the electrode column 11. On the other hand, the location for applying the glues is defined on each of the side plates 22, and an operation for adding glues may be processed through an opening of the accommodating slot 24 and the notch 223, which is more convenient for operation.

In order to improve a fixing effect of the end cover 2 and the battery cell 1, a bonding area between the side plates 22 and the battery cell 1 ranges from 50% to 80% of a contact area between the side plates 22 and the battery cell 1, such as 60%, 65%, 70%, or 75%.

In order to facilitate an extension of an end of the battery cell 1 inside the accommodating slot, the accommodating slot 24 is disposed in clearance fit with the battery cell 1 to facilitate assembly of the battery cell 1 and the end cover 2.

In order to ensure certain contact pressure between the side plates 22 and the battery cell 1 to improve a bonding effect, optionally, a fit clearance between the accommodating slot 24 and the battery cell 1 ranges from 1 mm to 2 mm, such as 1.2 mm, 1.4 mm, 1.5 mm, 1.7 mm, or 1.9 mm.

The battery system provided in the embodiment adopts the above cell module, with high processing accuracy, low cost, and a reliable structure.

What is claimed is:

1. A battery cell module, comprising a plurality of battery cells and a plurality of end covers, wherein an end of each of the battery cells is provided with one of the end covers, and any two adjacent ones of the end covers are detachably connected to each other, so that the plurality of battery cells are relatively fixed into a group;

wherein each of the end covers comprises a cover plate and a plurality of side plates, the cover plate is a polygonal plate with an even number of side edges, and each side edge of the cover plate is connected to a respective one of the plurality of side plates;

wherein the plurality of side plates are consecutively connected; the plurality of side plates comprise a first subset of consecutively connected side plates in which each side plate is provided with a clamping block, and a second subset of consecutively connected side plates in which each side plate is provided with a clamping slot; and wherein a middle portion of each of the plurality of side plates is provided with a notch having an opening facing downward toward another end of each of the battery cells, and wherein, for each side plate in the second subset of side plates, the notch is provided in a wall of the clamping slot.

2. The battery cell module of claim 1, wherein each of the end covers is provided with an accommodating slot, and an end of the battery cell corresponding to the end cover is fixed in the accommodating slot.

3. The battery cell module of claim 2, wherein two opposite side plates in any two adjacent ones of the end covers are engaged with each other.

4. The battery cell module of claim 3, wherein the clamping block and the clamping slot opposite to each other on any two adjacent ones of the end covers are engaged with each other.

5. The battery cell module of claim 4, wherein a width of the clamping slot is gradually increased towards inside of the accommodating slot along a radial direction of a battery cell corresponding to the clamping slot, and a shape of the clamping block is matched with a shape of the clamping slot.

6. The battery cell module of claim 3, wherein the cover plate is a regular hexagon plate.

7. The battery cell module of claim 3, wherein the plurality of battery cells are cylindrical, a side surface of each of the plurality of side plates facing one of the battery cells corresponding to the side plate is an arc-shaped surface matched with an outer wall of the battery cell, and a side surface of the side plate away from the battery cell is a plane.

8. The battery cell module of claim 3, wherein the plurality of side plates are fixedly bonded with the battery cells corresponding to the side plates.

9. The battery cell module of claim 8, wherein a bonding area between the plurality of side plates and the battery cells corresponding to the side plates ranges from 50% to 80% of a contact area between the plurality of side plates and the battery cells.

10. The battery cell module of claim 2, wherein each accommodating slot is correspondingly disposed in clearance fit with one of the battery cells, and a fit clearance therebetween ranges from 1 mm to 2 mm.

11. The battery cell module of claim 2, wherein a depth of the accommodating slot ranges from 5 mm to 20 mm.

12. The battery cell module of claim 1, wherein each of the end covers is sleeved at an end of one of the battery cells and provided with a via hole, and an electrode column of each of the battery cells is extended out of a respective one of the end covers from the via hole of the respective end cover.

13. The battery cell module of claim 12, wherein each of the end covers is made of an insulating material and configured to support a busbar connected to the electrode column.

14. The battery cell module of claim 13, wherein each of the end covers is provided with a flange surrounding the via hole, and wherein the flange is configured to support the busbar connected to the electrode column.

15. The battery cell module of claim 14, wherein each end cover or flange is provided with a position column matched with the busbar.

16. A battery system, comprising a battery cell module, wherein the battery cell module comprises a plurality of battery cells and a plurality of end covers, wherein an end of each of the battery cells is provided with one of the end covers, and any two adjacent ones of the end covers are detachably connected to each other, so that the plurality of battery cells are relatively fixed into a group;

wherein each of the end covers comprises a cover plate and a plurality of side plates, the cover plate is a polygonal plate with an even number of side edges, and each side edge of the cover plate is connected to a respective one of the plurality of side plates;

wherein the plurality of side plates are consecutively connected; the plurality of side plates comprise a first subset of consecutively connected side plates in which each side plate is provided with a clamping block, and a second subset of consecutively connected side plates in which each side plate is provided with a clamping slot; and wherein a middle portion of each of the plurality of side plates is provided with a notch having an opening facing downward toward another end of each of the battery cells, and wherein, for each side plate in the second subset of side plates, the notch is provided in a wall of the clamping slot.

17. The battery cell module of claim 1, wherein each of the end covers is provided with an accommodating slot, and an end of the battery cell corresponding to the end cover is fixed in the accommodating slot;

each of the end covers is sleeved at an end of one of the battery cells and provided with a via hole, and an electrode column of each of the battery cells is extended out of a respective one of the end covers from the via hole of the respective end cover.

18. The battery cell module of claim 1, wherein each of the end covers is provided with an accommodating slot, and an end of the battery cell corresponding to the end cover is fixed in the accommodating slot; two opposite side plates in any two adjacent ones of the end covers are engaged with each other;

each of the end covers is sleeved at an end of one of the battery cells and provided with a via hole, and an electrode column of each of the battery cells is extended out of a respective one of the end covers from the via hole of the respective end cover.

19. The battery cell module of claim 1, wherein each of the end covers is provided with an accommodating slot, and an end of the battery cell corresponding to the end cover is fixed in the accommodating slot; two opposite side plates in any two adjacent ones of the end covers are engaged with each other; and the clamping block and the clamping slot opposite to each other on any two adjacent ones of the end covers are engaged with each other;

each of the end covers is sleeved at an end of one of the battery cells and provided with a via hole, and an electrode column of each of the battery cells is extended out of a respective one of the end covers from the via hole of the respective end cover.

* * * * *